A. S. CUBITT.
METHOD OF AND MEANS FOR REVERSING MOTORS.
APPLICATION FILED JUNE 3, 1909.
960,000.
Patented May 31, 1910.
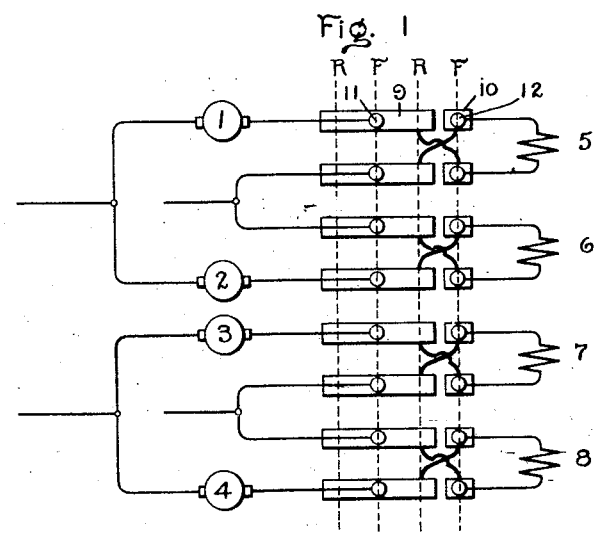
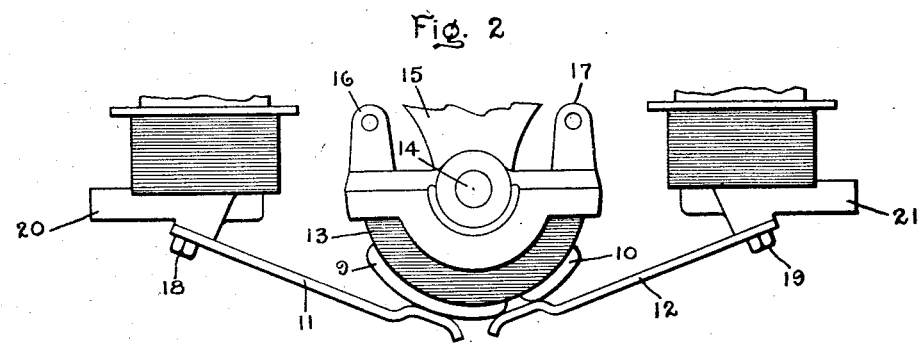
WITNESSES:
INVENTOR
ARCHIBALD S. CUBITT.
BY
ATT'Y.

UNITED STATES PATENT OFFICE.

ARCHIBALD S. CUBITT, OF PITTSFIELD, MASSACHUSETTS, ASSIGNOR TO GENERAL ELECTRIC COMPANY, A CORPORATION OF NEW YORK.

METHOD OF AND MEANS FOR REVERSING MOTORS.

960,000.  Specification of Letters Patent.  Patented May 31, 1910.

Application filed June 3, 1909. Serial No. 499,860.

*To all whom it may concern:*

Be it known that I, ARCHIBALD S. CUBITT, a subject of the King of Great Britain, residing at Pittsfield, county of Berkshire, State of Massachusetts, have invented certain new and useful Improvements in Methods of and Means for Reversing Motors, of which the following is a specification.

In electrically driven railway cars or locomotives in which four driving motors are employed the motors are often normally operated in pairs, the motors of each pair being always connected in parallel with one another. With such an equipment the pairs of motors are first connected in series and then in parallel, thereby giving what is called "series parallel" and "full parallel" operation. In such systems it has heretofore been the custom to reverse the motors by reversing the armatures with reference to the fields of the motors, this being accomplished by opening the armature circuit and closing it again in reverse connection with reference to its field. A motor control system of this type is shown in the patent to F. E. Case, 809,773, dated January 9, 1906.

With systems of the kind above referred to it has been the custom under emergency conditions for the operator to throw his reverser to the reverse position thereby connecting each pair of motors in a closed circuit and allowing one to act as a generator to pump current through the other motor acting as a motor. This action will take place owing to the residual magnetism in the fields of the motors and to the fact that as the fields are never exactly the same the voltage of one motor will be higher than the voltage of the other and current will commence to flow from one to the other through the closed circuit established by the reversing switch. It has been found that when a control system of this kind is operated in this manner, if the operator throws his reverser back again to its original position before the car has come to rest, the interruption of the current flowing in the closed circuit through each pair of motors will cause serious arcing at the contacts of the reverser owing to the fact that the closed circuit is interrupted during the process of reversal.

My invention consists in providing a new and improved method of and means for reversing the motors in a two or four motor equipment, such that the burning of the contacts during reversing will be effectively prevented. To this end, instead of reversing the armature with relation to the field of each motor, I reverse the field with reference to the armature and arrange for the short circuiting of said fields during the operation of reversal. In this way the field of each motor is "killed" during reversal and the voltage of the motors is reduced practically to zero, thereby reducing the current in the circuit substantially to zero and removing all danger of arcing at the contacts of the reversing switch.

In carrying out my invention I provide a reversing switch of the finger and segment type having a forward and reverse position and a transition position in which certain of the fingers bridge the spaces between certain segments and effect the short circuiting of the motor fields in changing from forward to reverse connections.

Referring to the drawing, Figure 1 shows diagrammatically four motors and a reversing switch for controlling the motor connections in accordance with my invention; and Fig. 2 is an end elevation of a portion of the reversing switch showing the relation of the segments and fingers.

In Fig. 1 the armatures of the motors are shown at 1, 2, 3 and 4 and their series fields at 5, 6, 7 and 8. The drum of the reverser, which is shown developed in the usual manner, is provided with eight pairs of segments 9 and 10 arranged, as shown, in four groups in which the segments are cross-connected, as clearly indicated. With these segments, coöperate fingers 11 and 12 connected, as shown, to the circuits leading to the armatures and fields. In the forward position, the fingers engage with the segments on the lines F F, as shown, while in the reverse position the fingers and segments engage on the lines R R. The middle lines F and R may coincide if it is desired to keep the angular movement of the switch small. The space between the segments 9 and 10 is made small enough so that the fingers 12 will, for an instant while the drum is moved from its forward to its reverse position or vice versa, bridge the space and connect the segments 9 and 10.

In Fig. 2 the drum of the reverser is shown at 13 pivoted on a shaft 14 mounted in a frame 15, the operating mechanism, which is not shown, being attached to the lugs 16 and 17. The drum 13, which may be of insulating material, carries the segments 9 and 10. The fingers 11 and 12, which coöperate with the segments 9 and 10, are secured by bolts 18 and 19 on the side frames 20 and 21. As shown in Fig. 2, the reverser drum is in its mid-position and finger 12 is bridging the gap between the segments 9 and 10.

From an inspection of the diagram of Fig. 1 it will be clear that in the forward position of the reverser the motors of each pair will be connected in parallel with one another with their fields and armatures in a certain relation, while in the reverse position of the reverser the motors will be connected in parallel with their fields reversed in relation to their armatures. It will also be clear that in throwing from one position to the other the fingers 12 by bridging the gaps between the segments 9 and 10 will for an instant short circuit the fields, thereby obtaining the results explained above.

While I have shown but one arrangement for carrying out my improved method of reversing two motors normally operated in parallel, I do not intend to limit myself thereto, except as called for by the following claims.

What I claim as new and desire to secure by Letters Patent of the United States, is:—

1. The method of reversing simultaneously two motors normally operated in parallel which consists in short-circuiting the fields by establishing the reverse connections between said fields and their armatures while the original connections still exist and then interrupting the original connections.

2. The method of reversing simultaneously two series motors normally operated in parallel which consists in short-circuiting the fields by establishing the reverse connections between said fields and their armatures while the original connections still exist and then interrupting the original connections.

3. In combination with two motors normally operated in parallel, a reverser of the finger and segment type having a forward and reverse position and a transition position in which certain of the fingers bridge the space between segments in the same line and effect the short circuiting of the motor fields in changing the relation of the latter with reference to their armatures.

4. In combination with two motors normally operated in parallel, a reverser of the finger and segment type having four groups of two segments each, two fingers coöperating with each group of segments, the space between the segments in each group being so small that it is bridged by one of the fingers when the reverser is thrown from one position to the other whereby the fields are short-circuited in effecting the reversal of their connections with their armatures.

In witness whereof, I have hereunto set my hand this 28th day of May, 1909.

ARCHIBALD S. CUBITT.

Witnesses:
J. T. HARTNETT,
H. FULWIDER.